July 15, 1969
C. J. HANSEN
3,455,404
FARM VEHICLE
Filed Oct. 18, 1966
3 Sheets-Sheet 1
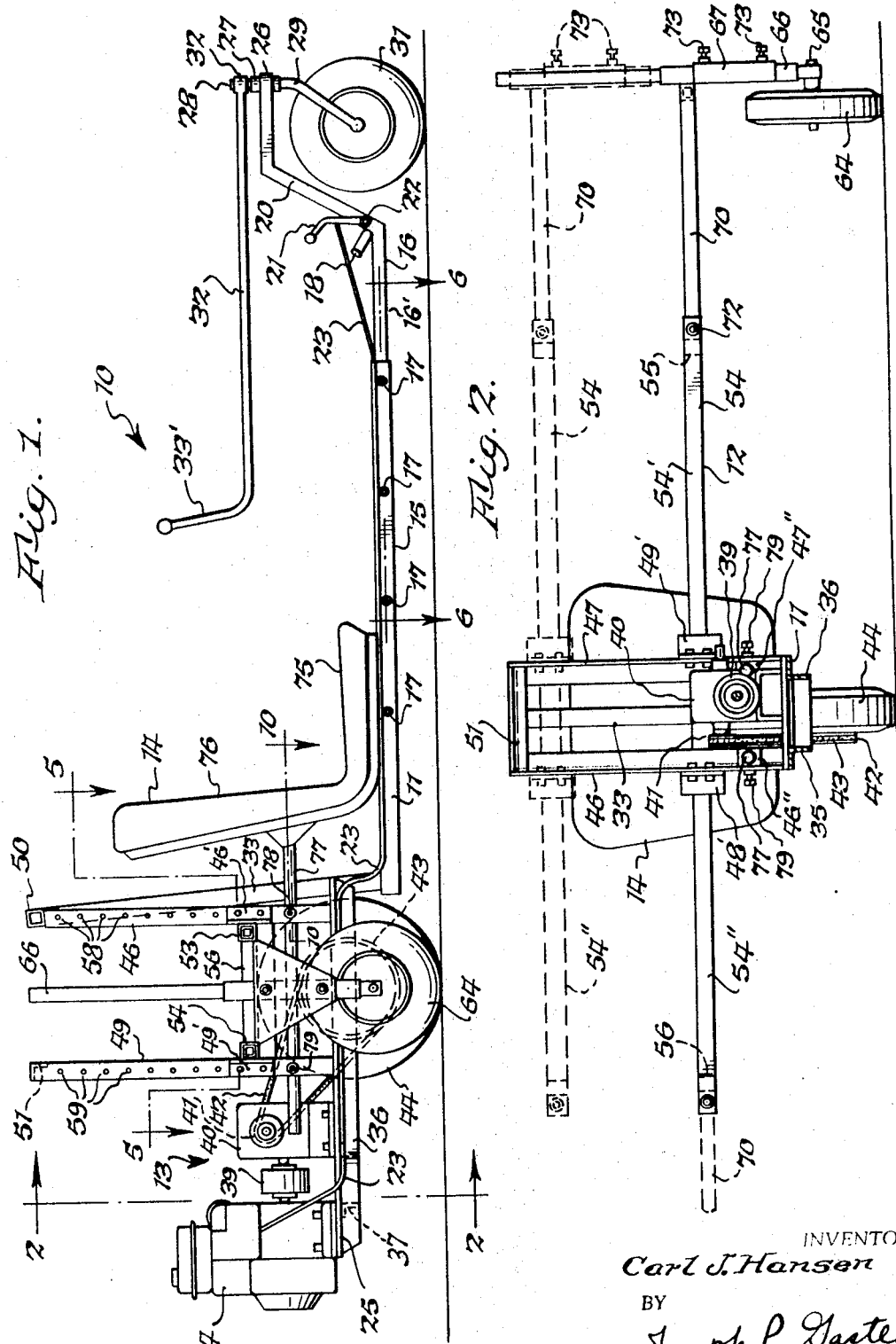
INVENTOR.
Carl J. Hansen
BY
Joseph P. Gastel
ATTORNEY.

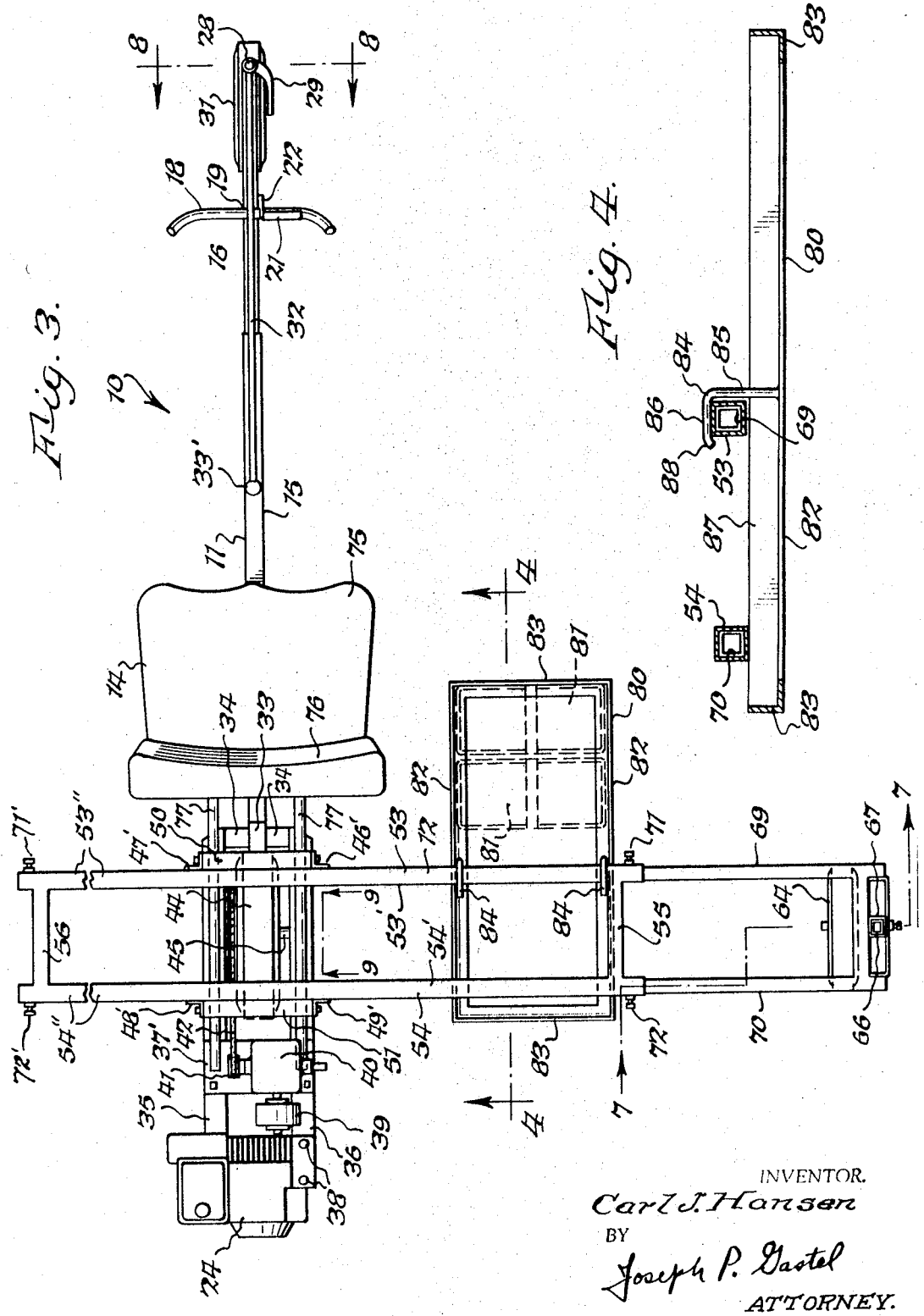

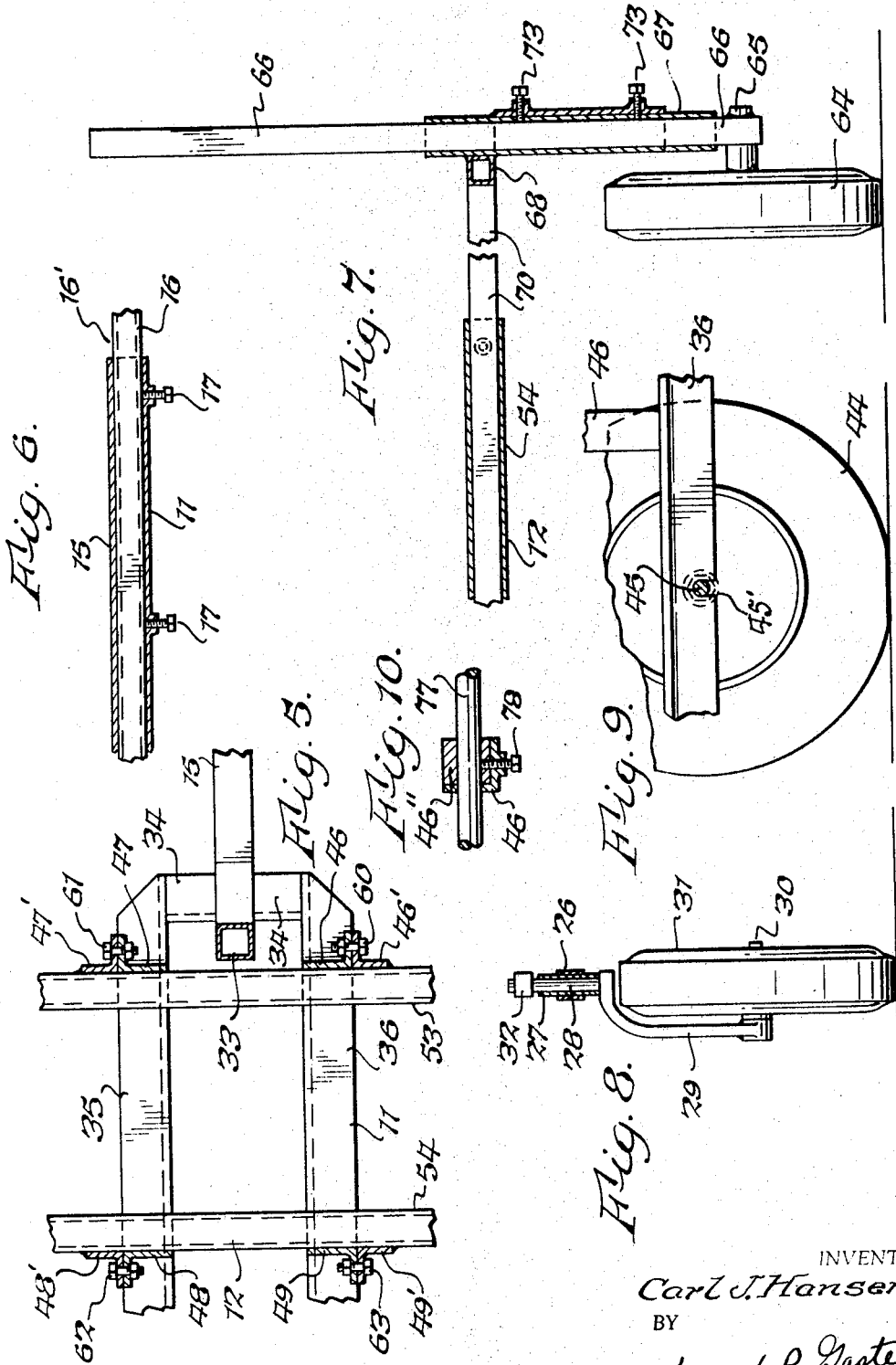

United States Patent Office 3,455,404
Patented July 15, 1969

3,455,404
FARM VEHICLE
Carl J. Hansen, County Line Road,
Medina, N.Y. 14103
Filed Oct. 18, 1966, Ser. No. 587,484
Int. Cl. B62d *61/00*
U.S. Cl. 180—25                6 Claims

ABSTRACT OF THE DISCLOSURE

A tricycle farm vehicle including a longitudinal frame section consisting of a telescopic tubular member with front and rear wheels and with a seat mounted on said tubular member below the axles of said wheels, a motor on said longitudinal frame section coupled to said rear wheel, a transverse frame section including means for adjusting said transvere frame section at different elevations on said longitudinal section with said transverse frame section having an outboard wheel vertically adjustable in height, and a carrier for harvested crops mounted on said transverse frame section and extending forwardly thereof for placement laterally abreast of the seat in a readily accessible but out-of-the-way location where it will not interfere with harvesting.

---

The present invention relates to an improved farm vehicle for permititng a worker to remain in a sitting position close to the ground while driving the vehicle and simultaneously performing such tasks as setting, thinning, transplanting, weeding and harvesting low growing crops.

Vehicles used in the farming of low growing crops which were known in the past were subject to certain shortcomings. Generally these vehicles were characterized by being relatively complicated and therefore expensive and beyond the reach of the average farmer. Other vehicles required that the person doing the actual work had to be accompanied by a vehicle driver. Other vehicles were relatively inflexible in that they could not be used to harvest crops of different heights nor could they be conveniently modified to run between rows of crops having different spacings. In addition, the vehicles were generally of a fixed construction and did not provide for changing the dimensions for maximum comfort of the operator. It is with the improved farm vehicle which overcomes all of the foregoing shortcomings that the present invention is concerned.

It is the primary object of the present invention to provide an improved highly versatile farm vehicle having an extremely simplified construction which leads to economy of manufacture and dependability in operation. A related object of the present invention is to provide an improved highly versatile farm vehicle which easily can be adjusted for use with crops growing in rows spaced different distances apart. A further related object of the present invention is to provide an improved highly versatile farm vehicle which can be adjusted in elevation in an extremely simple and convenient manner to clear crops of different heights. A still further related object of the present invention is to provide an improved highly versatile farm vehicle which can be adjusted to accommodate a right-handed or left-handed person in an extremely simple manner. Yet another related object of the present invention is to provide an improved highly versatile farm vehicle which can be adjusted in an extremely simple manner for accommodating workers of different sizes to provide them with maximum comfort. Still another related object of the present invention is to provide an improved highly versatile farm vehicle in which a portion of the frame serves the additional purpose of carrying the containers in which the produce is placed. Another related object of the present invention is to provide an improved highly versatile farm vehicle including an unique bracket arrangement for locating the containers being filled within convenient reach of any particular worker. Other objects and attendant advantages of the present invention will readily be perceived hereafter.

The improved highly versatile farm vehicle of the present invention is essentially a tricycle having a longitudinal frame section mounting substantially aligned front and rear wheels with a seat therebetween and an engine drive located at the rear of the vehicle. A transverse frame section is movably mounted on the longitudinal frame section, and carries a third wheel at its outboard end. This third wheel is movable relative to the other two wheels to adjust the lateral spacing between the wheels to thereby permit the farm vehicle to be adjusted for crops having differently spaced rows therebetween. In addition, means are provided for varying the elevation of the transverse frame section so that it can clear crops having different heights. The operator has the convenience of a foot rest on the longitudinal section which can be adjusted for maximum comfort. A foot throttle for the engine drive is provided proximate the foot rest so that the operator may cause the vehicle to move without utilizing his hands, thereby leaving them free for work. The transverse section can be mounted to the left or the right of the longitudinal frame section for the convenience of right and left-handed people, respectively. In addition, a movable container carrying frame can be mounted on the transverse frame section at the most convenient location for the operator. The present invention will be more fully understood when the following portions of the specification are read in conjunction with the accompanying drawings wherein:

FIGURE 1 is a side elevational view of the improved farm vehicle of the present invention;

FIGURE 2 is a rear elevational view taken along line 2—2 of FIG. 1 and showing the elevation adjustment for the transverse frame section and the manner in which it can be mounted on opposite sides of the longitudinal frame section;

FIGURE 3 is a plan view of the improved farm vehicle shown in FIGURE 1;

FIGURE 4 is a view taken substantially along line 4—4 of FIGURE 3 and showing the manner in which a container carrier is mounted on the transverse frame section;

FIGURE 5 is a view taken substantially along line 5—5 of FIGURE 4 and showing the manner in which the longitudinal frame section and the transverse frame section are joined;

FIGURE 6 is a view taken substantially along line 6—6 of FIGURE 1 and showing the manner in which the foot rest can be adjusted;

FIGURE 7 is a cross sectional view taken substantially along line 7—7 of FIGURE 3 and showing the manner in which the outboard wheel can be adjusted both in elevation and in a lateral direction relative to the rear wheel;

FIGURE 8 is a view taken substantially along line 8—8 of FIGURE 3 and showing the manner in which the front wheel is mounted;

FIGURE 9 is a view taken in the direction of line 9—9 showing the manner in which the rear wheel is mounted; and FIGURE 10 is a cross sectional view taken along line 10—10 showing the structure for adjusting the seat.

The improved farm vehicle 10 includes a longitudinal frame section 11 having a transverse frame section 12 movably mounted thereon and a drive assembly 13 mounted to the rear of seat 14 on section 11.

The longitudinal frame section 11 includes a square tubular member 15 which receives the left end of the horizontal part 16' of wheel supporting portion 16 in telescoping relationship. Screws 17 (FIGS. 1 and 6) rigidly secure them together. The distance between foot rest 18 (FIG. 3) and seat 14 can thus be adjusted by telescoping parts 15 and 16 to accommodate different leg lengths of different operators. Foot rest 18 is an elongated curved rod having its central portion 19 welded or otherwise suitably secured at the point where portion 20 of the wheel support portion 16 extends upwardly relative to the horizontal portion 16'. A foot throttle lever 21 has its lower end pivotally mounted at 22 to portion 20 and is spring biased to an idle position through the Bowden cable 23 having its right end (FIG. 1) attached to throttle lever 21 and its other end attached to the throttle of gasoline engine 24 mounted on platform 25. An upper horizontal portion 26 extends forwardly of portion 20 and mounts bearing 27 which extends around pin 28 of wheel carrying arm 29 having a horizontal axle 30 at its lower end for rotatably mounting front wheel 31. A tiller or driving arm 32 has one end keyed to pin 28 and the other end terminating at handle portion 33' which the operator can grasp in the event he has to turn the vehicle. It will be noted from FIGURE 1 that the horizontal axis of wheel supporting axle 30 lies behind the axis of pin 28 because arm 29 extends rearwardly. This will cause the wheel to tend to remain in alignment with portions 15 and 16 of the longitudinal frame when the vehicle is being driven by the operator without steering. Thus, the vehicle will automatically tend to travel in a straight line along the crop row.

The longitudinal frame section 11 also includes an upwardly inclined square tubular member 33 having its lower portion welded to the end of tubular portion 15 remote from wheel 31. Welded to vertical member 33 are horizontal members 34, to which are welded longitudinally extending angles 35 and 36 which are joined at their rear edge by horizontal brace 37. The opposite sides of engine 24 are bolted to angles 35 and 36. More specifically, bolts 38 secure one side of engine 24 to angle 36 and similar bolts, not shown, secure the other side of engine 24 to angle 35. Engine 24 may be any conventional two- or four-cycle gasoline engine which is commonly known in the art, and therefore further description is deemed unnecessary, or it may be an engine which operates on liquified gas. The output shaft of engine 24 is coupled to centrifugal clutch 39 which in turn is coupled to gear reducer 40, which is mounted on plate 37' secured between angles 35 and 36.

A pulley 41 is mounted on the output shaft of gear reducer 40 and is encircled by the belt 42. Pulley 43 is rigidly secured to the rim of rear wheel 44 journalled on shaft 45, having opposite ends mounted between the vertical legs of angles 35 and 36. As can be seen from FIG. 9, one end of shaft 45 fits up into cutout 45' in vertical legs of angle 36. The other end of shaft 45 fits into a similar cutout in the vertical leg of angle 35. Suitable nuts (not shown) secure shaft 45 to angles 35 and 36.

An arrangement is provided for adjustably mounting transverse frame section 12 relative to longitudinal frame section 11. In this respect four angles or posts 46, 47, 48 and 49 (FIG. 5) extend upwardly from angles 35 and 36. The lower ends of angles 46 and 49 are secured, as by welding, to horizontal angle 36. The lower ends of angles 47 and 48 are secured as by welding to horizontal angle 35. A tubular member 50 (FIG. 1) extends between and is welded across the tops of angles 46 and 47 and the central portion of member 50 has the upper end of brace 33 welded thereto. An angle member 51 has its opposite ends welded to angles 48 and 49.

The transverse frame section 12 consists of elongated square tubular members 53 and 54. First ends of members 53 and 54 are secured to each other by tubular square channel 55 having its opposite ends welded to said members. The opposite ends of members 53 and 54 are joined to each other by welding at the opposite ends of tubular member 56 (FIG. 3). As can be seen from FIGURE 2, it is the central portion of frame members 53 and 54 which are secured to longitudinal frame section 11. Members 53 and 54 extend equal amounts on opposite sides of the longitudinal frame section 11. In this respect, member 54 is divided into two halves 54' and 54" and member 53 is divided into two halves 53' and 53".

Transverse frame section 12 can be positioned at any desired vertical height between angular posts 46, 47, 48 and 49 so that it will clear crops of different heights. If it is sowing which is being done, the frame section will be placed relatively low to the ground and seeds or the plants will be carried in containers straddling members 53 and 54. If relatively high plants, such as tomatoes are being harvested, the transverse frame section will be placed at a relatively high position on the angular posts. For low crops the frame section will be positioned at a relatively low elevation. The rule which is followed in the placement of the transverse frame section 12 is to keep it as low as possible consistent with clearing the crops for ease in reaching the items carried on the frame.

The transverse frame section 12 is mounted on posts 46, 47, 48 and 49 in the following manner: Short angle sections 46', 47', 48' and 49' are fastened to the transverse frame section, as by welding, and are adapted to be located in contiguous abutting relationship with angle posts 46, 47, 48 and 49, respectively, when the transverse frame 12 is located in the position shown in FIGURE 5. Each short angle section 46' through 49' has two holes therein. For example, part 46' has two spaced holes (FIG. 1). These holes are spaced the same amount apart as are the spaced holes in each of the angle posts. For example, angle post 46 includes a plurality of spaced holes 58 and angle post 49 includes a plurality of spaced holes 59. The other two posts 47 and 48 include holes which are analogous. Short angle sections 46' and 47' have first leg portions welded to tubular channel 53, as can be seen from a comparison of FIGURES 1, 3 and 5. As can be seen from FIG. 5, two of the legs of short angle sections 46' and 47' face each other and are spaced apart an amount which is slightly greater than the spacing between the parallel legs of angle posts 46 and 47. Thus, the legs of short angles 46' and 47' can straddle the legs of angle posts 46 and 47, and after corresponding holes in the short angle sections 46' and 47' are aligned with corresponding holes in angle posts 46 and 47, nuts and bolts 60 are inserted through the aligned apertures in post 46 and short angle 46' and nuts and bolts 61 are inserted through aligned apertures in short angle 47' and angle post 47. Short angle sections 48' and 49' have central portions of first legs welded to tubular member 54, as shown in FIGURE 5, so that the other leg portions of each of the short angles lie substantially parallel to each other and are spaced apart an amount which is slightly greater than the spacing between the outer faces of angle posts 48 and 49. Nuts and bolts 62 are inserted through aligned apertures in short angle 48' and angle post 48, and nuts and bolts 63 are inserted through aligned apertures in short angle sections 49' and angle posts 49. After all of the nuts and bolts have been tightened at any desired elevation of the transverse frame section, the latter is rigidly secured to longitudinal frame section 11. The horizontal frame section 12 can occupy a position from a relatively few inches above the ground to many inches above the ground depending on whether it is the lowest or the highest apertures which are mated for receiving the assembling nuts and bolts. It can thus be seen where the vertical adjustment can be effected in an extremely simple and rapid manner because of the sliding connection between the longitudinal and transverse frame sections.

It will be appreciated that different crops are planted in rows which are spaced different amounts. It will also be appreciated that the wheels of the vehicle must travel in the spaces between the rows of crops. Therefore, an adjustment is provided for outboard wheel 64, which is journalled on axle 65 attached to the lower portion of post 66 which is received in telescoping relation within vertical sleeve 67 welded in turn to horizontal brace 68, the opposite ends of which are welded to legs 69 and 70. Legs 69 and 70 telescope into tubular frame members 53 and 54, respectively.

Whenever it is desired to adjust the spacing between outboard wheel 64 and rear wheel 44, it is merely necessary to loosen said screws 71 and 72 and telescope legs 69 and 70 relative to frame members 53 and 54, respectively. When the desired spacing is obtained, screws 71 and 72 are tightened.

An adjustment is provided for outboard wheel 64 to cause frame members 53 and 54 to assume a horizontal position. More specifically, whenever frame members 53 and 54 are moved vertically to adjust their vertical position in the manner described in detail above, a corresponding adjustment must be made for outboard wheel 64 to cause frame members 53 and 54 to maintain a horizontal attitude. To this end, screws 73 are provided which extend through sleeve 67. When these screws are loosened, vertical post 66 can be moved relative to sleeve 67 and after it has been moved so that wheel 64 occupies a position which causes frame members 54 and 55 to be horizontal, said screws 73 are tightened.

As can be seen from FIGURES 1, 2 and 3, the outboard wheel 64 is at one side of seat 14. However, if it is desired to have wheel 54 occupy a position at the opposite side of seat 14, it is merely necessary to loosen set screws 71 and 72 to permit removal of legs 69 and 70 and wheel 54 attached thereto. Thereafter, legs 69 and 70 are inserted into halves 53″ and 54″ of frame members 53 and 54, rather than halves 53′ and 54′ which received them previously, as shown in the drawings. Thereafter, set screws 71′ and 72′ are tightened after the desired spacing has been obtained between outboard wheel 64 and rear wheel 44.

As noted above, a seat 14 including a seat portion 75 and a back portion 76, is mounted on the longitudinal frame section 11. The undersurface of the seat includes a portion which rests on the top of tubular member 15. To hold seat portion 75 squarely in position inverted U-shaped members with their legs extending downwardly and spaced apart a slightly greater distance than the width of member 15 can be provided to essentially provide a slot for receiving member 15. Extending from the rear surface of rear portion 76 of seat 14 are a pair of rods 77. One rod 77 extends through aligned apertures in angle posts 46–49, and the other rod 77 extends through posts 47–48. A set screw 78 extends through the side of leg post 46 shown in FIGURE 1 for engaging post 77, as shown in FIGURES 1 and 10. Another set screw 79 extends through the side of angle post 49 for engaging rod 77. As can be seen from FIG. 10, an apertured block 46″ in post 46 receives rod 77. Blocks analogous to block 46″ are provided in posts 47, 48 and 49. If it is desired to adjust the position of the seat 76, it is merely necessary to loosen set screws 77 and 79 on posts 46 and 49, respectively, and also loosen analogous set screws in posts 47 and 48. Thereafter, seat 14 can be slid back and forth along the longitudinal axis of tubular member 15 until it reaches a position wherein the operator's feet will rest comfortably on foot rest 18. Thereafter, all of the set screws, such as 78 and 79, are tightened. It will readily be appreciated that different farm workers have a different requirement for positioning of seat 14 and it is to the foregoing end that the adjustment has been provided.

If it is desired to attach seat 14 in a permanent position, it can be placed so that the rear of back portion 76 abuts post 33 which can carry a permanent mounting. The underside of seat portion 75 can then be permanently attached to member 15. To obtain adjustment under the foregoing circumstances longitudinal frame member 16 is telescoped relative to member 15 to adjust the distance between the seat 14 and foot rest 18.

As noted above, the horizontal frame section 12 is used for carrying the harvested products or the plants being sown or the like because the portions 53 and 54 thereof provide a rest for the containers. Thus, four or five bushels can be placed along frame 12. However, when the operator is harvesting or planting it is very inconvenient to have to reach all the way back to the frame 12. Therefore, a detachable carrier frame 80 is provided for mounting baskets or containers 81 within convenient reach of the person sitting on seat 14. Frame 80 consists of spaced pairs of angles 82 and 83 having their opposite ends secured to each other by welding in the configuration shown in plan in FIGURE 3. Inverted L-shaped hooks 84 have the lower portions of their vertical legs 85 secured, as by welding, to the horizontal legs of angles 82. The horizontal legs 86 of L-shaped members 84 extend rearwardly, as shown in FIG. 4. The spacing between horizontal legs 86 and the uppermost portion of vertical legs 87 of angles 82 is slightly greater than the depth of tubular member 53. As can be seen from FIGURE 4, the end 88 of horizontal leg 86 is hooked slightly downwardly. It can thus be seen that carrier frame 80 can be mounted in the position shown in FIGURES 3 and 4 so that it is supported by L-shaped hooks 84 from member 53. The rear portion of carrier frame 80 abuts the underside of tubular frame member 54 and bears upwardly against it both when a load is being carried in containers 81, and when there are no containers because of the unbalance due to the offset of hooks 84. Thus, the operator works until the containers on carrier frame 80 are either full or empty and at this time he gets off the seat and puts these containers on transverse frame section 12 and takes other containers from this transverse section and places them on the carrier frame. It can be seen that the vertical legs of frame members 82 are spaced a sufficient distance apart to receive the baskets. Carrier 80 can be mounted on either side of seat 80. If desired, a plurality of carriers, such as 80, can be mounted on transverse frame section 12.

In operation it is merely necessary for the operator to sit on seat 14 and whenever he desires to move, he need merely depress throttle 21 with his foot to increase the speed of engine 24 which in turn will automatically cause centrifugal clutch 29 to engage to drive the vehicle. The vehicle thus can be moved intermittently along rows of crops as required during harvesting. In addition, it is to be noted that the person can harvest a row of crops on each side of him and thus handle two rows at once. To this end, if it is more convenient, a carrier such as 80, can be mounted on each side of the seat 14. As noted above, because of the manner in which front wheel 31 is suspended, very little time and attention need be paid to steering the vehicle because it will tend to align itself and move in a straight line.

As noted above, the elevation of transverse frame section 12 can be adjusted in a convenient manner to cause this frame to clear crops having different heights, it being understood that it is most desirable that this transverse frame section always be at the lowest height consistent with clearing the crops. In addition, outboard wheel 64 can be adjusted relative to rear wheel 44 so that the vehicle can easily be used with crops having rows spaced different amounts apart.

If desired, the foot throttle 21 may be replaced by a hand throttle mounted on handle portion 33′. In this respect, a Bowden wire unit, such as 23, can extend upwardly from frame portion 20 and run along driving arm 32. The hand throttle which is mounted on handle portion 33′ may be a lever, such as the type used for bicycle hand brakes or the type used on motorcycle handle bars.

It consists essentially of a lever pivoted at one end to which the core of the Bowden cable is attached. With a modification of this type the vehicle rider merely actuates the lever when he grasps handle 33', it being understood that the lever is biased normally to a position which causes engine 24 to idle.

In addition, the seat 14 can be modified by providing wings extending both forwardly of back portion 76 and upwardly from seat portion 75. This portion can extend upwardly approximately eight inches so that it provides a rest for the hips of the vehicle operator when he leans over to reach for crops. It will be appreciated that if these wings are too high, it will hit the operator's ribs and therefore these wing portions should only be high enough so as to provide a rest for the hips. In other words, the wing portions would make seat 14 look somewhat like an arm chair with the arms being relatively low.

I claim:

1. A tricycle farm vehicle comprising a longitudinal farme section, a transverse frame section, means mounting said transverse frame section relative to said longitudinal frame section, a front wheel including a first axle monuted relative to said longitudinal frame section, a rear wheel including a second axle mounted proximate said longitudinal frame section substantially in alignment with said front wheel, seat means mounted in contiguous relationship to the ground on said longitudinal frame section below said first and second axles and in substantial alignment with said front and rear wheels, an outboard wheel mounted on said transverse frame section laterally of said front and rear wheels, means for adjusting the spacing of said outboard wheel laterally relative to said longitudinal frame section, motor means for driving said vehicle, means mounting said entire transverse frame section for vertical adjusting movement relative to said longitudinal frame section, a base on said longitudinal frame section and disposed in a plane parallel to the plane of said transverse frame section, said motor means being mounted on said base, said means for mounting said transverse section for vertical movement comprising a plurality of post means positioned both longitudinally and laterally of said longitudinal frame section and extending transversely relative to the planes of said base and of said transverse section, and a sliding connection between said transverse section and said post means.

2. A tricycle farm vehicle as set forth in claim 1 wherein said plurality of post means include lower portions effectively attached to said base means and higher portions extending upwardly therefrom, and wherein said sliding connection comprises members on said transverse frame section spaced to correspond with the positioning of said plurality of post means and providing a bracketing connection with said plurality of post means, and locking means for securing said last-mentioned members to said post means whereby said transverse frame section is locked to said post means in vertically adjusted spaced position relative to said base and said longitudinal frame section.

3. A tricycle farm vehicle as set forth in claim 2 including support means for said outboard wheel, and means on said support means for movably mounting said outboard wheel relative to said transverse frame section to adjust the position thereof incidental to changing the vertical position of said transverse frame section to cause said transverse frame section to assume a substantially horizontal position in all positions thereof when said front, rear and outboard wheels engage the ground.

4. A tricycle farm vehicle as set forth in claim 3 wherein said transverse frame section is located behind said seat means, and carrier means adapted to be mounted on said transverse frame section and including a portion extending forwardly thereof to occupy a position substantially to the side of said seat means.

5. A tricycle farm vehicle as set forth in claim 3 including an arm mounted on said longitudinal section for pivotal movement about a vertical axis, an axle on said arm for mounting said front wheel, a tiller attached to said arm for steering said vehicle, said axle being located rearwardly of said vertical axis to cause said front wheel to tend to assume a position in alignment with said longitudinal frame section when said tiller is not being used for steering.

6. A tricycle farm vehicle as set forth in claim 5 wherein said motor means comprises an engine, means mounting said engine on said base, a centrifugal clutch coupled to said engine, a gear reducer coupled to said centrifuagl clutch, drive means coupling said gear reducer to said rear wheel, a foot rest located proximate said front wheel, a foot throttle located proximate said foot rest, and linkage means coupling said foot throttle to said engine thereby to vary the speed of said engine by actuation of said foot throttle.

References Cited

UNITED STATES PATENTS

| D. 148,040 | 12/1947 | Steel. | |
| 2,520,835 | 8/1950 | England. | |
| 2,583,358 | 1/1952 | Cesan | 280—32.5 X |
| 2,575,521 | 11/1951 | Ireland. | |
| 2,854,084 | 9/1958 | Issac | 280—32.5 X |
| 3,037,570 | 6/1962 | Olson | 280—32.5 X |

FOREIGN PATENTS

| 78,525 | 11/1954 | Denmark. |
| 673,597 | 6/1952 | Great Britain. |
| 1,378,078 | 10/1964 | France. |

A. HARRY LEVY, Primary Examiner

U.S. Cl. X.R.

180—1, 54; 280—32.5, 34, 43